(12) United States Patent
Horak

(10) Patent No.: US 12,467,838 B2
(45) Date of Patent: Nov. 11, 2025

(54) SAMPLE EXTRACTION SYSTEM AND METHOD WITH PRESSURE DECOUPLING

(71) Applicant: Andrew Alliance S.A., Canton of Geneva (CH)

(72) Inventor: Giorgio Horak, Geneva (CH)

(73) Assignee: Andrew Alliance S.A. (CH)

( * ) Notice: Subject to any disclaimer, the term of this patent is extended or adjusted under 35 U.S.C. 154(b) by 287 days.

(21) Appl. No.: 18/090,669

(22) Filed: Dec. 29, 2022

(65) Prior Publication Data
US 2023/0204479 A1 Jun. 29, 2023

Related U.S. Application Data

(60) Provisional application No. 63/294,456, filed on Dec. 29, 2021.

(51) Int. Cl.
*G01N 1/40* (2006.01)
*G01N 1/14* (2006.01)

(52) U.S. Cl.
CPC ............ *G01N 1/4077* (2013.01); *G01N 1/14* (2013.01); *G01N 2001/1418* (2013.01); *G01N 2001/4088* (2013.01)

(58) Field of Classification Search
CPC ....... G01N 2001/381; G01N 2001/382; G01N 2001/4088; B01L 3/50255
See application file for complete search history.

(56) References Cited

U.S. PATENT DOCUMENTS 4,090,850 A * 5/1978 Chen .................... B01L 3/5025
422/535
4,301,010 A * 11/1981 Eddleman .............. B01D 29/05
210/406

(Continued)

FOREIGN PATENT DOCUMENTS

CN 104436753 A 3/2015
CN 112170373 A 1/2021

(Continued)

OTHER PUBLICATIONS

International Preliminary Report on Patentability in international patent application No. PCT/IB2022/062880 mailed on Jul. 11, 2024.

(Continued)

*Primary Examiner* — Tran M. Tran
(74) *Attorney, Agent, or Firm* — Schmeiser, Olsen & Watts LLP; Victor J. Baranowski, Esq.

(57) ABSTRACT

A sample filtration and/or extraction system includes a vacuum manifold configured to connect with a vacuum pump, a vacuum chamber such that each of a plurality of filter columns or the filter plate is configured to be disposed at least partially within the vacuum chamber, the plurality of filter columns or the filter plate including a plurality of openings configured to receive a sample, and a passive pressure decoupling device configured to be placed on a top of the plurality of filter columns or the filter plate, such that each of the plurality of openings of the plurality of filter columns or the filter plate is covered by the passive pressure decoupling device. The passive pressure decoupling device includes a reserve air volume structure above each of the plurality of openings.

20 Claims, 14 Drawing Sheets

(56) References Cited

U.S. PATENT DOCUMENTS

| | | | |
|---|---|---|---|
| 4,810,471 A | 3/1989 | Wachob et al. | |
| 4,895,706 A * | 1/1990 | Root | B01L 3/50255 422/534 |
| 4,902,481 A * | 2/1990 | Clark | B01L 3/50255 435/297.5 |
| 4,927,604 A * | 5/1990 | Mathus | B01D 29/05 422/534 |
| 4,948,564 A * | 8/1990 | Root | B01L 9/06 422/534 |
| 5,108,704 A * | 4/1992 | Bowers | C12M 23/12 210/323.1 |
| 5,141,719 A * | 8/1992 | Fernwood | B01D 61/18 422/549 |
| 5,219,528 A * | 6/1993 | Clark | B01L 3/5025 422/527 |
| 5,227,137 A * | 7/1993 | Monti | G01N 33/5304 422/537 |
| 5,443,734 A | 8/1995 | Fetner et al. | |
| 5,620,894 A | 4/1997 | Barger et al. | |
| 5,792,430 A * | 8/1998 | Hamper | B01J 19/0046 422/138 |
| 5,906,795 A * | 5/1999 | Nakashima | G01N 35/1009 73/864.32 |
| 5,915,284 A * | 6/1999 | Meltzer | B01L 3/0279 73/864.17 |
| 6,063,282 A * | 5/2000 | Moulton | B01D 29/52 436/178 |
| 6,133,045 A * | 10/2000 | Johnson | B01L 3/50255 422/549 |
| 6,159,368 A * | 12/2000 | Moring | B01L 3/50255 422/258 |
| 6,309,605 B1 * | 10/2001 | Zermani | B01L 3/50255 422/535 |
| 6,338,802 B1 * | 1/2002 | Bodner | B01D 61/18 210/474 |
| 6,375,855 B1 * | 4/2002 | Vassarotti | B01L 3/5021 210/361 |
| 6,395,231 B1 | 5/2002 | Kraemer et al. | |
| 6,419,827 B1 * | 7/2002 | Sandell | G01N 35/0099 422/298 |
| 6,455,007 B1 * | 9/2002 | Mansky | B01L 3/5025 436/178 |
| 6,491,873 B2 | 12/2002 | Roberts et al. | |
| 6,551,556 B1 | 4/2003 | Park et al. | |
| 6,592,826 B1 | 7/2003 | Bloecker et al. | |
| 6,666,978 B2 | 12/2003 | Steinel | |
| 6,852,290 B2 * | 2/2005 | Hager | B01L 3/563 210/233 |
| 6,902,680 B2 * | 6/2005 | Collasius | B01L 3/50255 422/561 |
| 6,997,066 B2 * | 2/2006 | DeSilva | G01N 35/1074 73/863.31 |
| 7,267,801 B2 * | 9/2007 | Hitch | G01N 35/1065 422/65 |
| 7,452,510 B2 | 11/2008 | Weinfield et al. | |
| 7,503,515 B2 * | 3/2009 | Lugmair | B01J 19/0046 241/179 |
| 7,700,369 B2 * | 4/2010 | Massaro | B01L 3/5085 422/63 |
| 7,824,623 B2 * | 11/2010 | Clark | B01D 61/18 422/534 |
| 8,148,169 B2 | 4/2012 | Gjerde et al. | |
| 8,377,394 B2 * | 2/2013 | Sakowski | B01L 3/50255 422/527 |
| 8,506,813 B2 * | 8/2013 | Alspektor | B01L 3/50255 422/534 |
| 8,802,026 B2 * | 8/2014 | Fulton | B01J 20/28004 422/402 |
| 10,031,122 B2 * | 7/2018 | Sieben | G01N 33/24 |
| 10,549,927 B2 | 2/2020 | Voss et al. | |
| 11,169,163 B2 * | 11/2021 | Zucchelli | G01N 35/1081 |
| 11,402,399 B2 * | 8/2022 | Charmillot | B01L 9/543 |
| 2002/0182118 A1 | 12/2002 | Perry | |
| 2002/0182718 A1 * | 12/2002 | Malmquist | B01F 35/7163 435/287.2 |
| 2003/0064423 A1 | 4/2003 | Gordon et al. | |
| 2003/0223912 A1 | 12/2003 | Knecht et al. | |
| 2004/0005608 A1 * | 1/2004 | Saghbini | G01N 1/286 435/6.12 |
| 2004/0018119 A1 * | 1/2004 | Massaro | B01L 3/0217 422/63 |
| 2004/0120860 A1 | 6/2004 | Ingenhoven | |
| 2005/0266585 A1 | 12/2005 | Bargh | |
| 2006/0013736 A1 * | 1/2006 | Blok | B01L 3/50255 422/400 |
| 2006/0198765 A1 * | 9/2006 | Gjerde | B01J 20/291 422/400 |
| 2007/0084777 A1 | 4/2007 | Harnack et al. | |
| 2011/0104026 A1 * | 5/2011 | Yoon | B01L 3/50255 422/527 |
| 2016/0123856 A1 * | 5/2016 | Slowey | G01N 1/4005 422/534 |

FOREIGN PATENT DOCUMENTS

| | | |
|---|---|---|
| CN | 213918014 U | 8/2021 |
| WO | 03089137 A1 | 10/2003 |
| WO | 2007013114 A1 | 2/2007 |
| WO | 2010026290 A1 | 3/2010 |

OTHER PUBLICATIONS

International Search Report and Written Opinion in PCT/IB2022/062880 mailed on Mar. 24, 2023.

* cited by examiner

SAMPLE EXTRACTION SYSTEM AND METHOD WITH PRESSURE DECOUPLING

RELATED APPLICATION

This application is a non-provisional patent application claiming priority to U.S. Provisional Patent Application No. 63/294,456, filed Dec. 29, 2021, entitled "Sample Extraction System and Method," which is incorporated herein by reference.

FIELD OF THE INVENTION

The invention relates generally to sample preparation and extraction. More particularly, the invention relates to sample preparation and extraction using a pressure driven manifold device.

BACKGROUND

The present invention relates to improving sample preparation and extraction with a vacuum manifold device. Embodiments described herein address the problem of variability of sample extraction efficiency because of non-homogenous behavior across different columns used for separation when a pressure difference is applied.

A common setup for sample extraction using a vacuum manifold 100 is shown in FIG. 1. The vacuum manifold 100 hosts a filter column 110. The filter column 110 is filled with liquid 111 and the filter column 110 contains a medium 112 which acts as a filter. The vacuum manifold 100 is connected to a vacuum pump that generates a pressure in a vacuum chamber 120 that is smaller than the atmospheric pressure. This causes the air flow to move from the top of a filter column 113, which is at the atmospheric pressure, to a bottom 114 of the vacuum chamber 120, pushing the liquid through the filters. If multiple filter columns are used in parallel with the vacuum manifold, then the behavior of each column influences the others. This is also true for filter plates which are composed of different filter columns or chambers.

As shown in FIG. 2, in instances where two or more columns 220 which are used in conjunction with a vacuum manifold 200 and a vacuum chamber 230, then the behavior of each column 220 might influence each other. For example, if one or more columns 220 is filled with a liquid 211 and filter medium 212, while one or more columns 220 has no liquid or filter medium, when a vacuum is applied to pressure the vacuum chamber 230, the airflow is unimpeded through a bottom 222 and top 221 of the column 220 that is free of liquid and filtration. This reduces the force created by the vacuum for pushing the liquid through the columns 220 that do contain the liquid 211.

Thus, a passive pressure decoupling device and method that can be used in a pressure driven manifold that homogenizes the behavior of the columns or the filter plate used for separation when a pressure difference is applied would be well received in the art.

SUMMARY

In one embodiment, a sample filtration and/or extraction system comprises: a vacuum manifold configured to connect with a vacuum pump; a vacuum chamber such that each of a plurality of filter columns or the filter plate is configured to be disposed at least partially within the vacuum chamber, the plurality of filter columns or the filter plate including a plurality of openings configured to receive a sample; and a passive pressure decoupling device configured to be placed on a top of the plurality of filter columns or the filter plate, such that each of the plurality of openings of the plurality of filter columns or the filter plate is covered by the passive pressure decoupling device, wherein the passive pressure decoupling device includes a reserve air volume structure above each of the plurality of openings.

Additionally or alternatively, the sample preparation and/or extraction system further includes a collection device located within the vacuum chamber, the collection device including a plurality of collection wells for receiving the sample from the plurality of filter columns or the filter plate.

Additionally or alternatively, the sample preparation and/or extraction system further includes a vacuum collar configured to host the plurality of filter columns or the filter plate, the vacuum collar comprising at least a portion of the vacuum chamber.

Additionally or alternatively, the sample preparation and/or extraction system further includes an automated robotic system configured to place the passive pressure decoupling device on the top of the plurality of filter columns or the filter plate.

Additionally or alternatively, the automated robotic gripper is system to remove the passive pressure decoupling device from the top of the plurality of filter columns or the filter plate.

Additionally or alternatively, the automated robotic system is configured to dispense the sample into the plurality of openings of the plurality of filter columns or the filter plate.

Additionally or alternatively, the automated robotic system is configured to apply a downward pressure on the passive pressure decoupling device in order to secure the passive pressure decoupling device onto the plurality of filter columns or the filter plate.

Additionally or alternatively, the reserve air volume structure above each of the plurality of openings is a separate air volume for each of the plurality of openings configured to create a local chamber volume of air above each of the plurality of openings.

Additionally or alternatively, the passive pressure decoupling device is configured to be reused for a plurality of sample filtrations and/or extractions.

In another embodiment, a sample filtration and/or extraction apparatus comprises: a passive pressure decoupling device configured to be placed on a top of a plurality of filter columns or a filter plate, such that each of a plurality of openings of the plurality of filter columns or the filter plate is covered by the passive pressure decoupling device, wherein the passive pressure decoupling device includes a reserve air volume structure above each of the plurality of openings.

Additionally or alternatively, the reserve air volume structure above each of the plurality of openings is a separate air volume for each of the plurality of openings configured to create a local chamber volume of air above each of the plurality of openings.

Additionally or alternatively, the passive pressure decoupling device is configured to be reused for a plurality of sample filtrations and/or extractions.

In another embodiment, a method of sample filtration and/or extraction comprises: providing a vacuum chamber; placing a plurality of filter columns or a filter plate such that a bottom side of the plurality of filter columns or the filter plate is within the vacuum chamber, the plurality of filter columns or the filter plate including a plurality of openings configured to receive a sample; placing a passive pressure decoupling device on a top side of the plurality of filter columns or the filter plate, wherein the passive pressure decoupling device includes a reserve air volume structure above each of the plurality of openings; and covering, by the passive pressure decoupling device, each of the plurality of openings by the passive pressure decoupling device.

Additionally or alternatively, the method of sample filtration and/or extraction further includes: positioning a collection device within the vacuum chamber, wherein the plurality of filter columns or the filter plate are placed above the positioned collection device.

Additionally or alternatively, the method of sample filtration and/or extraction further includes: positioning a vacuum collar around a portion of the vacuum chamber above the positioned collection device.

Additionally or alternatively, the method of sample filtration and/or extraction further includes: dispensing, by an automated robotic system, at least one sample within at least one of the plurality of openings of the plurality of filter columns or the filter plate.

Additionally or alternatively, the method of sample filtration and/or extraction further includes: performing, by the automated robotic system, the placing the passive pressure decoupling device on a top side of the plurality of filter columns or the filter plate.

Additionally or alternatively, the method of sample filtration and/or extraction further includes: applying, by the automated robotic system, downward pressure on the passive pressure decoupling device in order to secure the passive pressure decoupling device onto the plurality of filter columns or the filter plate.

Additionally or alternatively, the method of sample filtration and/or extraction further includes: initiating a vacuum pump connected to the vacuum chamber to create a vacuum pressure within the vacuum chamber to allow the dispensed sample to move downward through the plurality of filter columns or the filter plate and into the collection device.

Additionally or alternatively, the method of sample filtration and/or extraction further includes: removing, by the automated robotic system, the passive pressure decoupling device from the top side of the plurality of filter columns or the filter plate; and reusing the passive pressure decoupling device on an additional filtration or extraction of another sample using a different plurality of filter columns or filter plate.

BRIEF DESCRIPTION OF THE DRAWINGS

The above and further advantages of this invention may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the invention.

DETAILED DESCRIPTION

Reference in the specification to "one embodiment" or "an embodiment" means that a particular, feature, structure or characteristic described in connection with the embodiment is included in at least one embodiment of the teaching. References to a particular embodiment within the specification do not necessarily all refer to the same embodiment.

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill having access to the teaching herein will recognize additional implementations, modifications and embodiments, as well as other fields of use, which are within the scope of the present disclosure as described herein.

As described herein, a system and method for sample preparation and/or extraction is described that is based on passive decoupling of each of a plurality of filter columns, or chambers of a filter plate, by creating local pressure on the top of the filters using a passive pressure decoupling device. The passive pressure decoupling device may take the form of a removable sealing material that is positioned on top of the filter columns, or a filter plate, which enables a passive pressure decoupling for all the chambers of the filter plate, or for all elements of a rack of columns. The sealing material may be any solid or semi-solid substance and may be deformable under differential vacuum pressure applied, as described herein. The present invention deploys a passive pressure decoupling device which can be applied and removed robotically, and which may be reusable over many applications.

Figure 1:
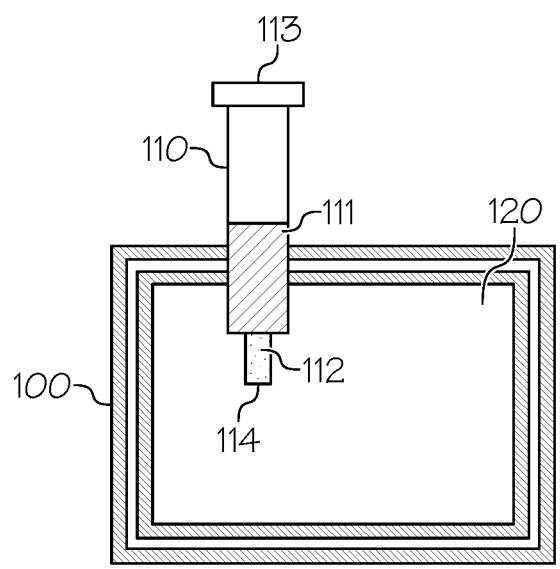
FIG. 1 depicts a prior art version of a sample extraction system using a vacuum manifold.
Figure 2:
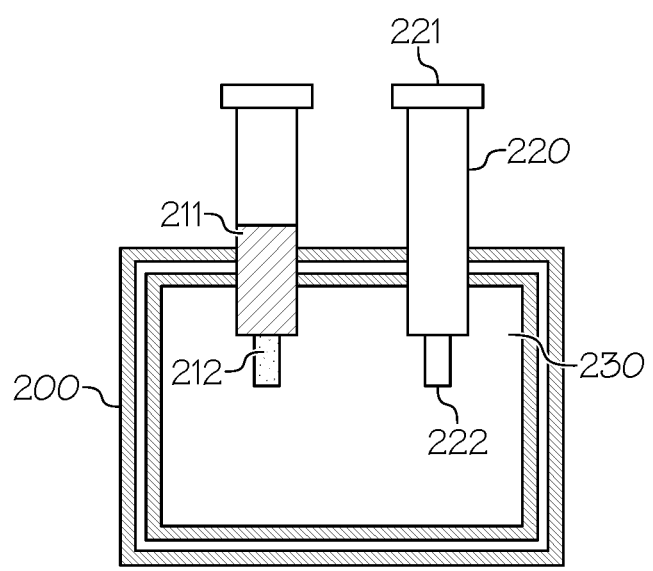
FIG. 2 depicts a prior art version of another sample extraction system using a vacuum manifold.
Figure 3:
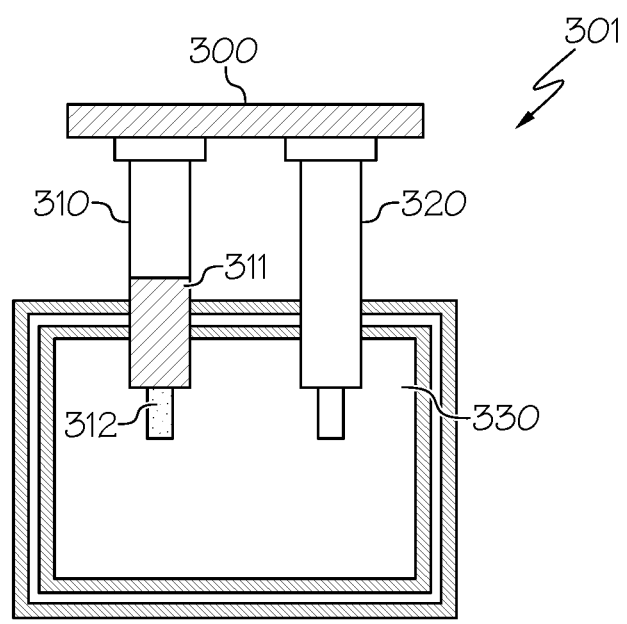
FIG. 3 depicts a schematic view of a sample filtration and/or extraction system, in accordance with one embodiment.

FIG. 3 depicts a schematic view of a sample filtration and/or extraction system 301, in accordance with one embodiment. The sample filtration and/or extraction system 301 includes a passive pressure decoupling device 300 that is added on top of both filter columns 310, 320. As shown, a first filter column 310 is filled with a sample 311, which may take the form of a liquid. The plurality of filter columns 310, 320 including a plurality of openings configured to receive a sample, which are shown covered by the passive pressure decoupling device 300. Proximate an outlet of the filter column 310 is a filtering medium 312, which may be configured to filter the sample 311.

As shown, the sample filtration and/or extraction system 301 includes a vacuum chamber 330. The vacuum chamber 330 is configured such that each of a plurality of filter columns 310, 320 is configured to be disposed at least partially within the vacuum chamber. In other words, as shown, the outlet end of the filter columns 310, 320 is located within the vacuum chamber 330. While not shown, a collection device, collection wells, or any other type of collection system may be located within the vacuum chamber 330 in order to collect the sample 311 when it is extracted through the filtering medium 312 and out of the filter column 310 when a vacuum pump creates a negative pressure within the vacuum chamber 330. The vacuum chamber 330 may be a chamber configured to create a low pressure, or a pressure lower than the atmospheric pressure, created by a vacuum pump connected thereto. Thus, the de-pressuring of the vacuum chamber may pull the sample through the filtering medium 312. This may be caused by airflow from the top of the filter column 310 to the bottom, pushing the liquid sample 311 through the filtering medium 312.

The passive pressure decoupling device 300 may be a covering which covers each of the filter columns 310, 320 in the sample filtration and/or extraction system 301. While only two filter columns 310, 320 are shown, the sample filtration and/or extraction system 301 may include any number of columns, or a filtration plate having many openings. Each of the openings of the columns and/or filtration plate may be covered by the passive pressure decoupling device 300. As described hereinbelow, the passive pressure decoupling device 300 may be reusable, and may be applied and removed by an automated robotic system. The passive pressure decoupling device 300 may be configured to create a local pressure for the first column 310 and a local pressure for the second column 320. Thus, "passive" herein may mean a device which may be placed on top of each of the openings of the columns and/or filtration plate which alters the functionality of the vacuum pressure on the samples within some or more of the openings of the columns and/or filtration plate. "Decoupling" herein may refer to the fact that device is capable of being removed from the tops of the columns and/or filtration plate in a manner that allows for reuse, removal and reapplication to another set of columns and/or filtration plate, as opposed to a device that requires an adhesive or which becomes permanently deformed and configured for a single use.

When a vacuum pump (not shown) in fluidic communication with the vacuum chamber 330 is activated, two different and decoupled airflows may be created. The empty column 320 stabilizes to the pressure present in the vacuum chamber much faster than the column 310 containing the sample 311 and the filtering medium 312.

In the embodiment shown, the passive pressure decoupling device 300 may be made of a material that is deformable, flexible, or the like, and/or configured to create a full and/or airtight seal with the top of the filter columns 310, 320 (or the openings of a filter plate) when the vacuum chamber 330 is pressurized by a vacuum pump. In other embodiments, some air may be configured to be pulled into the filter columns 310, 320 from outside the vacuum chamber 330 through the opening, even after the passive pressure decoupling device 300 is located thereon. In such an embodiment, the passive pressure decoupling device 300 may be made of a material that explicitly does not create a seal with the top of the filter columns 310, 320 (or the openings of a filter plate). In some embodiments, the passive pressure decoupling device 300 may be made of a partially porous material which impedes airflow which facilitates a pressure difference with the atmospheric pressure, but does still allow a reduced amount of airflow therethrough when the vacuum chamber 330 is pressurized by a vacuum pump (relative to the airflow which would occur if the openings were uncovered). The passive pressure decoupling device 300 may be compressed by a manual technician or by an automated robotic system to be secured to the top of the filter columns 310, 320 (or a filter plate). For example, an automated robotic system may be configured to apply a downward pressure on the passive pressure decoupling device in order to secure the passive pressure decoupling device 310, 320 onto the plurality of filter columns 310, 320 (or the filter plate).

Upon completion of extraction and/or filtration, the passive pressure decoupling device 300 vacuum chamber may become depressurized. This may allow for the passive pressure decoupling device 300 to be easily removed from the top of the filter columns 310, 320 (or a filter plate). This removal may be automated or may be conducted manually. Thus, the passive pressure decoupling device 300 is configured to be reused for a plurality of sample filtrations and/or extractions.

Figure 4:
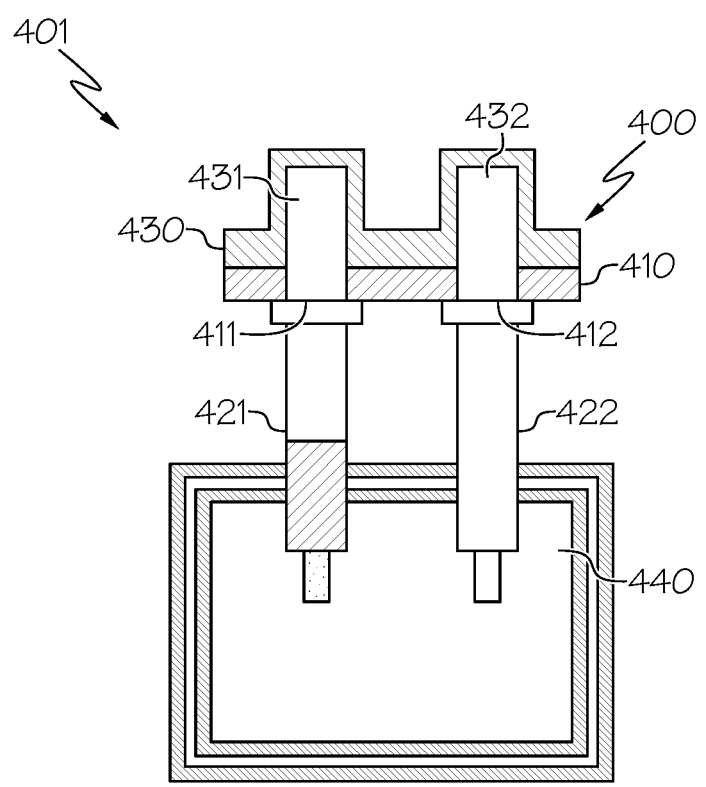
FIG. 4 depicts a schematic view of another sample filtration and/or extraction system, in accordance with one embodiment.

FIG. 4 depicts a schematic view of another sample filtration and/or extraction system 401, in accordance with one embodiment. The sample filtration and/or extraction system 401 may be similar to the above-described sample filtration and/or extraction system 301. For example, the sample filtration and/or extraction system 401 includes a vacuum chamber 440 like the vacuum chamber 330. The sample filtration and/or extraction system 401 includes a first filter column 421 (like the first filter column 310) filled with a sample and having a filtering medium at a bottom end. The sample filtration and/or extraction system 401 further includes a second filter column 422 (like the second filter column 320) that is empty and includes no sample or filtering medium.

Unlike the sample filtration and/or extraction system 301, the sample filtration and/or extraction system 401 includes a passive pressure decoupling device 400 which includes a reserve air volume structure 431, 432 above each of the plurality of openings. As shown, the passive pressure decoupling device 400 includes multiple layers. A first sealing layer 410 may be made of a sealing material that is designed to create a seal at the top of the openings of the columns 421, 422 (or the openings of a filter plate). The first sealing layer 410 may include openings 411, 412 which align with the openings of the columns 421, 422 (or the openings of a filter plate). The first sealing layer 410 may create an air-tight seal in this manner when the vacuum chamber 440 is pressurized by a vacuum pump. In some embodiments, the sealing layer 410 may be unnecessary, and the passive pressure decoupling device 400 may comprise a single solid material which may be configured to be compressed tightly against the top of the openings of the columns 421, 422 during vacuum pressurization.

The passive pressure decoupling device 400 further is shown having a solid structure 430 located above the first sealing layer 410. The solid structure 430 is designed to create the reserve air volume structures 431, 432 above each of the filter columns 421, 422. The reserve air volume structures 431, 432 may be air volume cells which include a pre-defined volume. The volume in each chamber above each of the openings of the columns 421, 422 may be the same, in one embodiment. In other embodiments, the passive pressure decoupling device 400 may provide different cell volumes above different columns, depending on the application. Whatever the embodiment, the volumes may ensure that a pre-defined amount of air will move through each column when the reduction of pressure is applied to the vacuum chamber 440 by the vacuum pump.

Figure 5:
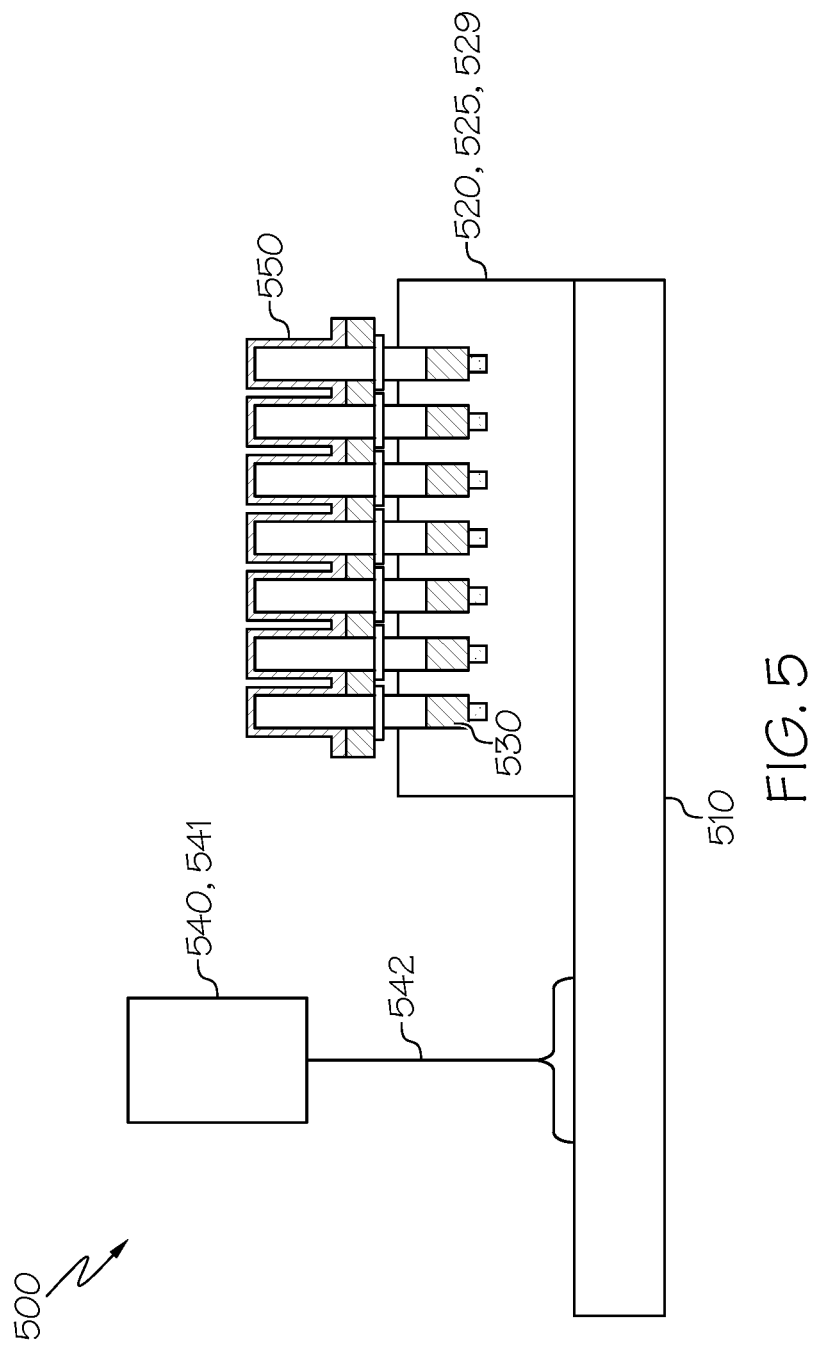
FIG. 5 depicts a schematic view of another sample filtration and/or extraction system using an automated robotic system, in accordance with one embodiment.

FIG. 5 depicts a schematic view of another sample filtration and/or extraction system 500 using an automated robotic system 540, in accordance with one embodiment. The automated robotic system 540 is shown including a gripper 542 which extends from a main body 541. The gripper 542 may be an attachment to the main body 541. The main body 541 may be a robotic arm which may be controllable and may be configured to move around in the sample filtration and/or extraction system 500 to perform mechanical functions, such as dispensing samples, moving the various components of the system into position, and the like.

As shown, the sample filtration and/or extraction system 500 includes a vacuum manifold 510 which may include a fluidic connection to a vacuum pump (not shown). The vacuum manifold 510 may be connected to a vacuum chamber 525, which may be like the vacuum chambers 330, 440, described hereinabove. The vacuum chamber 525 may further include a vacuum collar 520, and a collection device 529. The vacuum collar may be part of the vacuum chamber, and may be a removable component thereto which may allow access to the collection device 529 located within the vacuum chamber 525. As shown, the sample filtration and/or extraction system 500 further includes a passive pressure decoupling device 550 which is located above filter columns 530. Like the passive pressure decoupling device 400, the passive pressure decoupling device 550 includes reserve air volume structures above each of the plurality of openings of the filter columns 530. Similar to the pressure decoupling device 400, the passive pressure decoupling device 550 may include a multi layered reserve air volume structure that includes a sealing layer and a solid structure layer defining the reserve air volume structures. In other embodiments, the passive pressure decoupling device 550 may not include a separate sealing layer.

The gripper 542 and/or the automated robotic system 540 may be configured to allow the automated manipulation of the vacuum collar 520 when the collection device 529 is placed beneath the filter plate to collect the sample of liquid which has been filtered and/or extracted. Once the sample of liquid has been dispensed inside the target chambers of the collection device 529, the passive pressure decoupling device 550 may be moved on top of the columns 530 and/or filter plate. This movement can be done by an operator (manually) or may be done by an automated robotic system, as described hereinbelow.

Typically, when performing filtration and/or extraction of samples, an array of columns and/or a filter plate having an array of sample vials, openings, bores, holes or the like are provided. The passive pressure decoupling devices 300, 400, 550 described herein may be configured to cover each and every opening in the array of columns and/or a filter plate, regardless of whether the columns or filter plate are filled with sample or not. Thus, the passive pressure decoupling devices 400, 550 may provide for a separate reserve air volume structure for each and every column opening and/or filtration plate opening in a provided array. While the embodiments shown include a separate reserve air volume structure for each and every column opening and/or filtration plate opening in a provided array, it is also contemplated that the passive pressure decoupling devices 400, 550 may provide one or more community reserve air volume(s) comprising a single air volume structure located in the passive pressure decoupling devices 400, 550 shared by a plurality of the openings of the columns and/or filtration plate.

Figure 6:
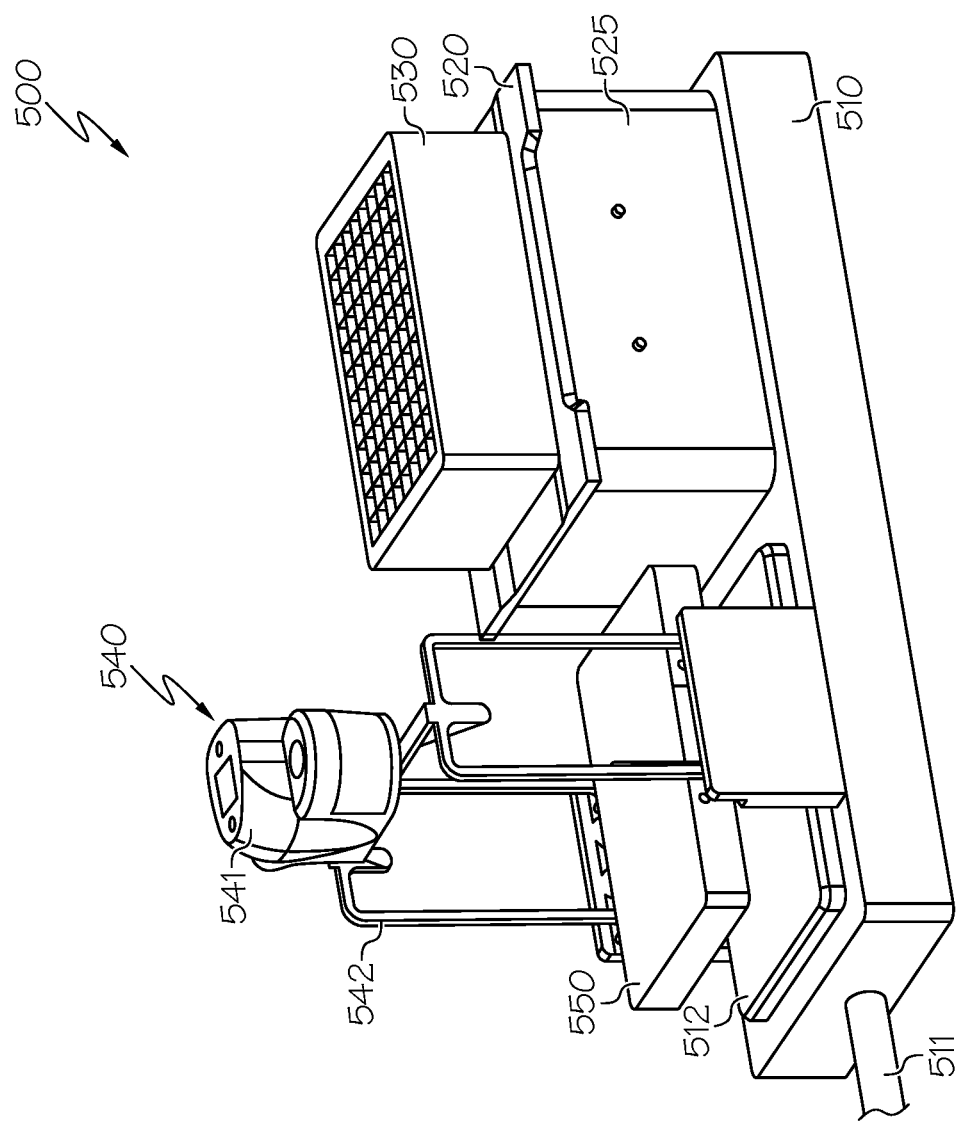
FIG. 6 depicts a perspective view of the sample filtration and/or extraction system of FIG. 4 in a first position, in accordance with one embodiment.

FIG. 6 depicts a perspective view of the sample filtration and/or extraction system 500 of FIG. 4 in a first position, in accordance with one embodiment. As shown, at this position, the passive pressure decoupling device 550 is located above a staging area 512, and is being gripped or otherwise held by the gripper 542 of the automated robotic system 540. The passive pressure decoupling device 550 is shown including an outer housing that surrounds the structure shown schematically in FIG. 5. Thus, under the outer housing, the passive pressure decoupling device 550 may include a plurality of individual reserve air volume structures, one for each of the various openings shown in the top side of the plurality of filter columns 530.

At the position shown in FIG. 6, the housing of the vacuum chamber 525 is located in position above the vacuum manifold 510 such that the vacuum manifold and the vacuum pump are in fluidic communication with the inside of the vacuum chamber 525. The vacuum collar 520 is located at a top of the vacuum chamber 525. A plurality of filter columns 530 are shown located above the vacuum collar 520. The vacuum collar 520 may thus be configured to host the plurality of filter columns 530 or the filter plate. The vacuum collar 520 may be considered comprising at least a portion of the vacuum chamber 525.

While not shown, the columns 530 may already be filled with sample prior to the position shown. The filling may occur manually by a technician, or by the automated robotic system 540. In the event that the filling of the sample is conducted by the automated robotic system, it should be understood that the gripper 542 of the automated robotic system 540 may be replaced by a different sample filling attachment for attachment to the main body 541.

Figure 7:
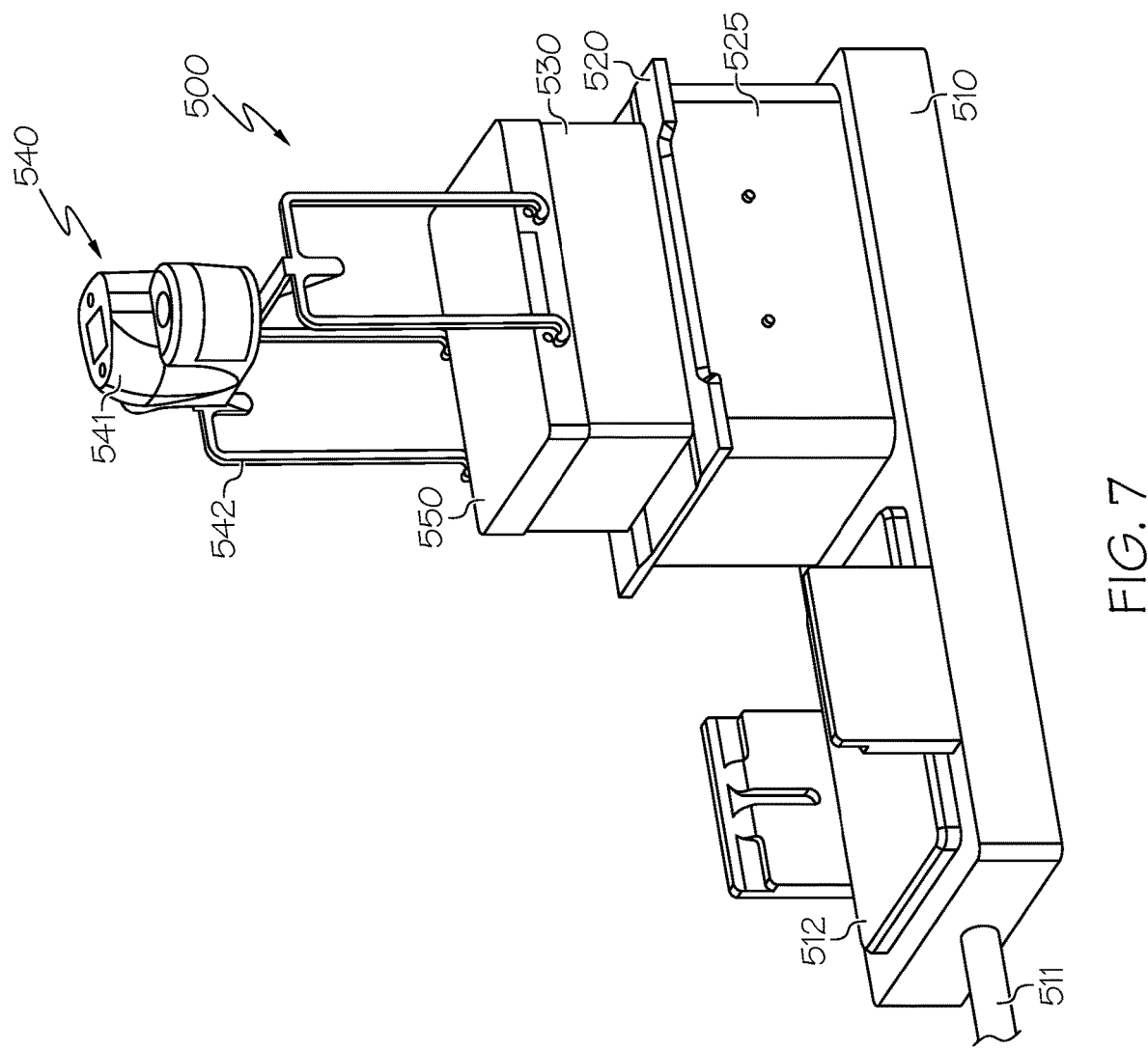
FIG. 7 depicts a perspective view of the sample filtration and/or extraction system of FIGS. 4 and 5 in a second position, in accordance with one embodiment.

FIG. 7 depicts a perspective view of the sample filtration and/or extraction system 500 of FIGS. 4 and 5 in a second position, in accordance with one embodiment. In the second position, the automated robotic system 540 has moved the passive pressure decoupling device 550 from the staging area 512 to above the openings of the plurality of filtration columns 530. At this stage, the automated robotic system 540 may apply a downward pressure to the top of the passive pressure decoupling device 550 in order to ensure an eventual seal between the passive pressure decoupling device 550 and the openings of the plurality of filtration columns 530 when the vacuum chamber is pressurized.

Figure 8:
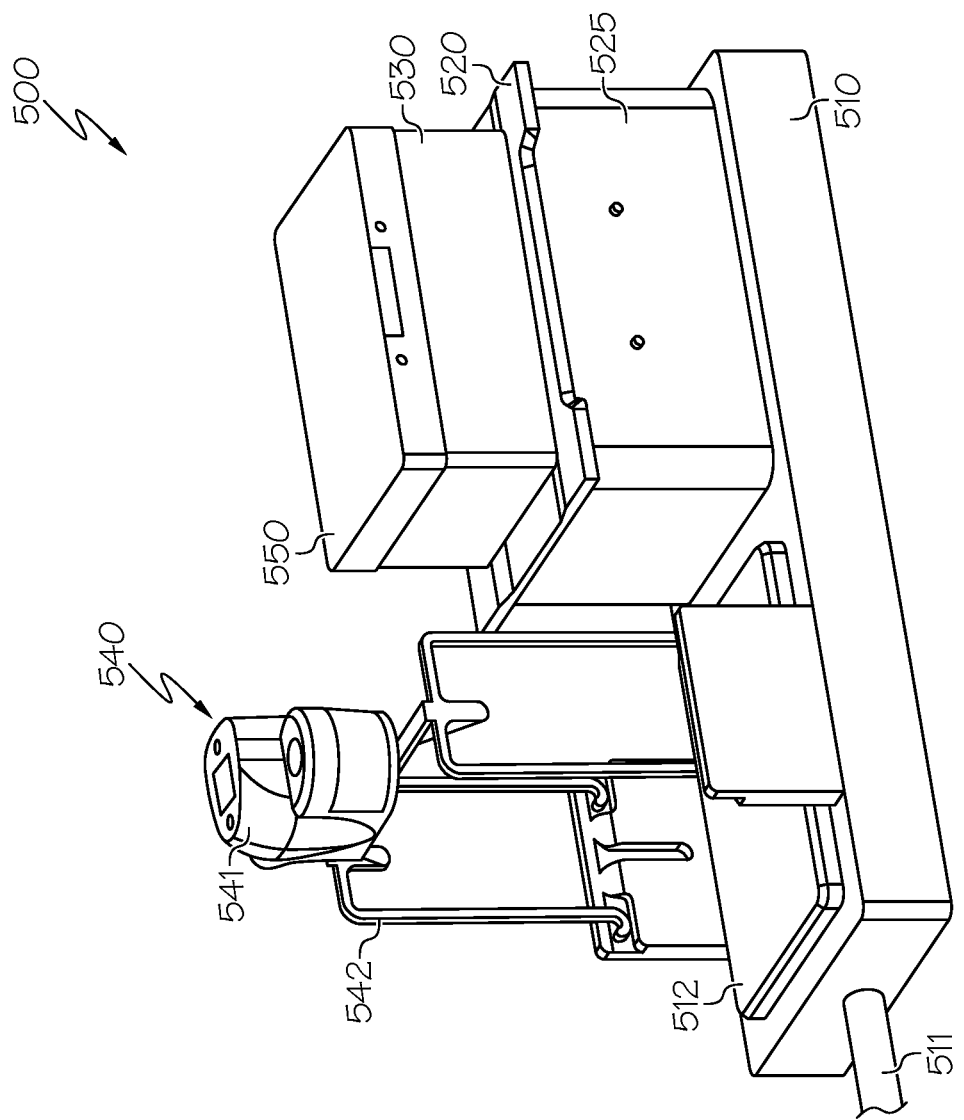
FIG. 8 depicts a perspective view of the sample filtration and/or extraction system of FIGS. 4-6 in a third position, in accordance with one embodiment.

FIG. 8 depicts a perspective view of the sample filtration and/or extraction system 500 of FIGS. 4-6 in a third position, in accordance with one embodiment. During the third position, the vacuum chamber 525 may become pressurized by a vacuum pump which is connected directly to a vacuum pump fluidic line 511. The vacuum pump fluidic line 511 may be a channel, tube or line connecting the vacuum manifold 510 to the vacuum pump. When the vacuum chamber 525 is pressurized, the automated robotic system 540 may return to the staging area 512, which may be considered a home position for the robot.

Figure 9:
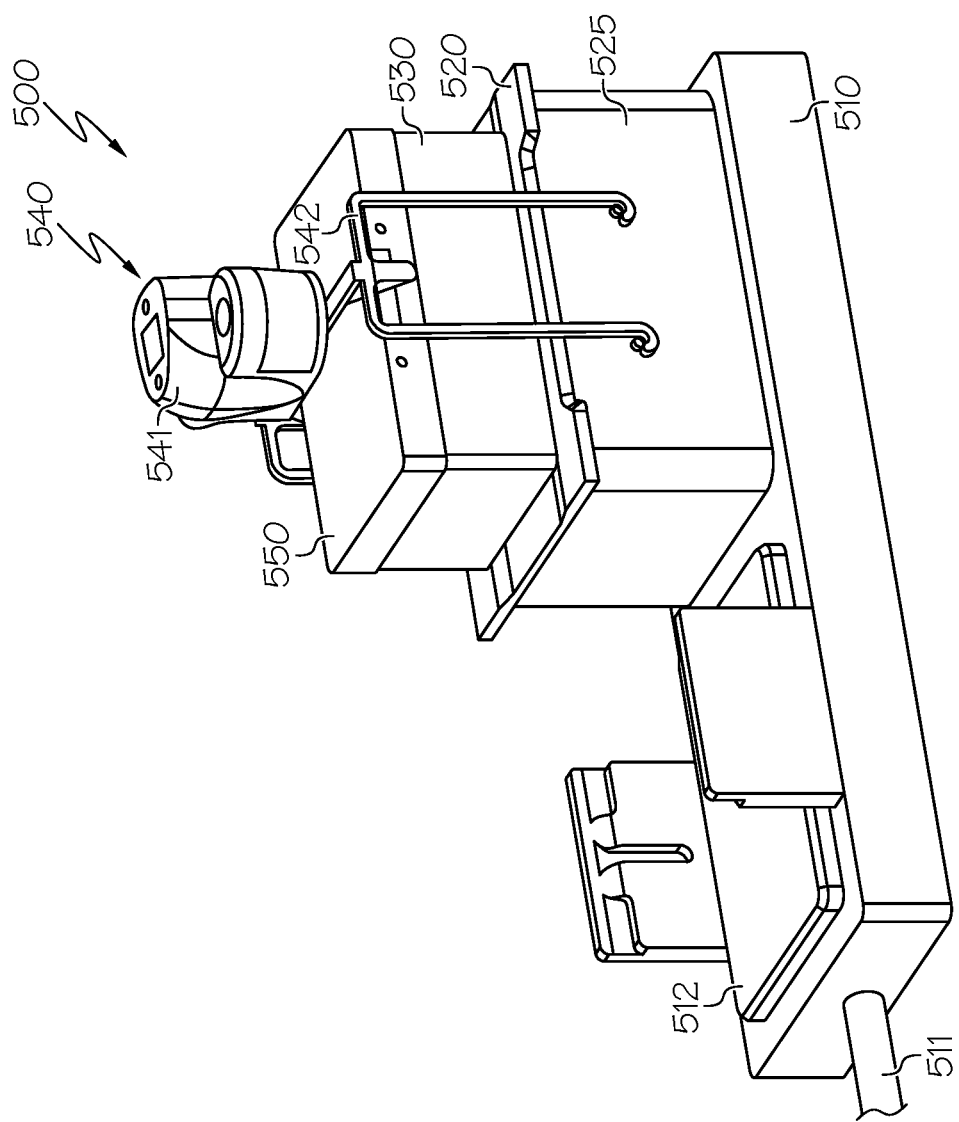
FIG. 9 depicts a perspective view of the sample filtration and/or extraction system of FIGS. 4-7 in a fourth position, in accordance with one embodiment.

FIG. 9 depicts a perspective view of the sample filtration and/or extraction system 500 of FIGS. 4-7 in a fourth position, in accordance with one embodiment. During the fourth position, the filtration and/or extraction of the sample from the plurality of filtration columns 530 and the vacuum chamber 525 has become depressurized with no vacuum pressurization coming from the vacuum. Here, the automated robotic system 540 returns above the filtration and/or extraction system and begins to grip the outer housing of the vacuum chamber 525.

Figure 10:
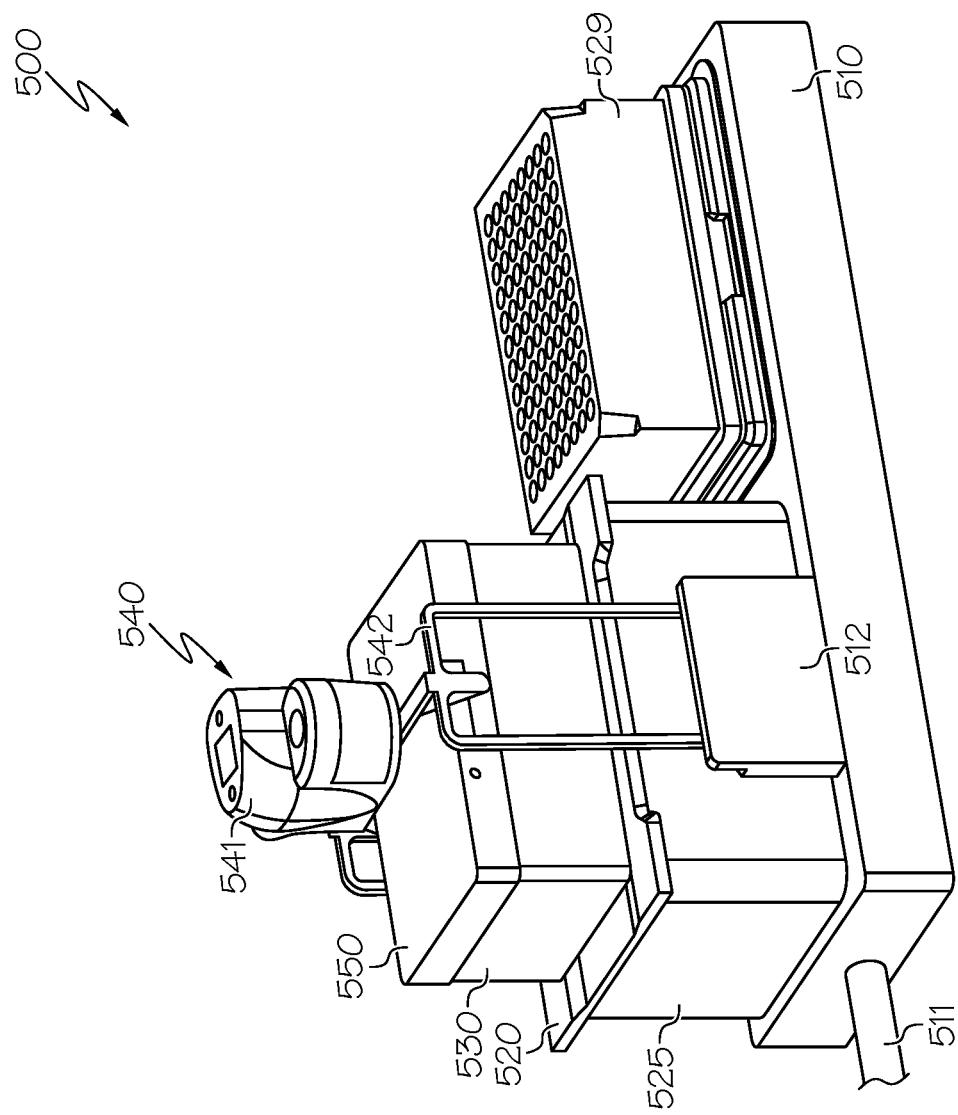
FIG. 10 depicts a perspective view of the sample filtration and/or extraction system of FIGS. 4-7 in a fifth position, in accordance with one embodiment.

FIG. 10 depicts a perspective view of the sample filtration and/or extraction system 500 of FIGS. 4-7 in a fifth position, in accordance with one embodiment. The automated robotic system 540 may be configured to lift up the vacuum chamber 525 outer housing, including the vacuum collar 520, the plurality of filtration columns 530 and the passive pressure decoupling device 550, while keeping the collection device 529 within the vacuum chamber 525 in place. The automated robotic system 540 may bring the vacuum chamber 525 outer housing, including the vacuum collar 520, the plurality of filtration columns 530 and the passive pressure decoupling device 550 back to the staging area 512 while exposing the collection device 529. The samples from the columns may thus be located in the various wells of the collection device 529 shown, after having been extracted and/or filtered.

While not shown, the automated robotic system 540 may be configured to specifically grip and separate the various features. For example, the automated robotic system 540 may remove the passive pressure decoupling device 550 from the top of the plurality of columns 530 and/or filtration plate. The columns 530 may also be removed from the vacuum collar 520, and the vacuum collar 520 may be removed from the outer housing of the vacuum chamber 525. The removal or separation of these features may alternatively be conducted manually. Whatever the embodiment, when the collection device 529 is removed and replaced by a new collection device for a next extraction and/or filtration process, the automated robotic system 540 may begin to move the various components 525, 520, 530, 550 back into place above the right side of the vacuum manifold 510 where the filtration and/or extraction occurs. Some or all of this moving and setting up the components 525, 520, 530, 550, and the filling of the new filtration columns with samples, in order to arrive back at the state shown in FIG. 6 may be conducted by the automated robotic system 540, or may be done manually by a technician or operator.

Various embodiments of the invention may comprise methods of sample filtration and/or extraction. The various methods may be deployed with a manual technician performing the steps. Alternatively, the automated robotic system 540 shown and described hereinabove may perform various steps of the method such that the process of sample filtration and/or extraction is automated and/or machine implemented with no human interaction.

Figure 11:
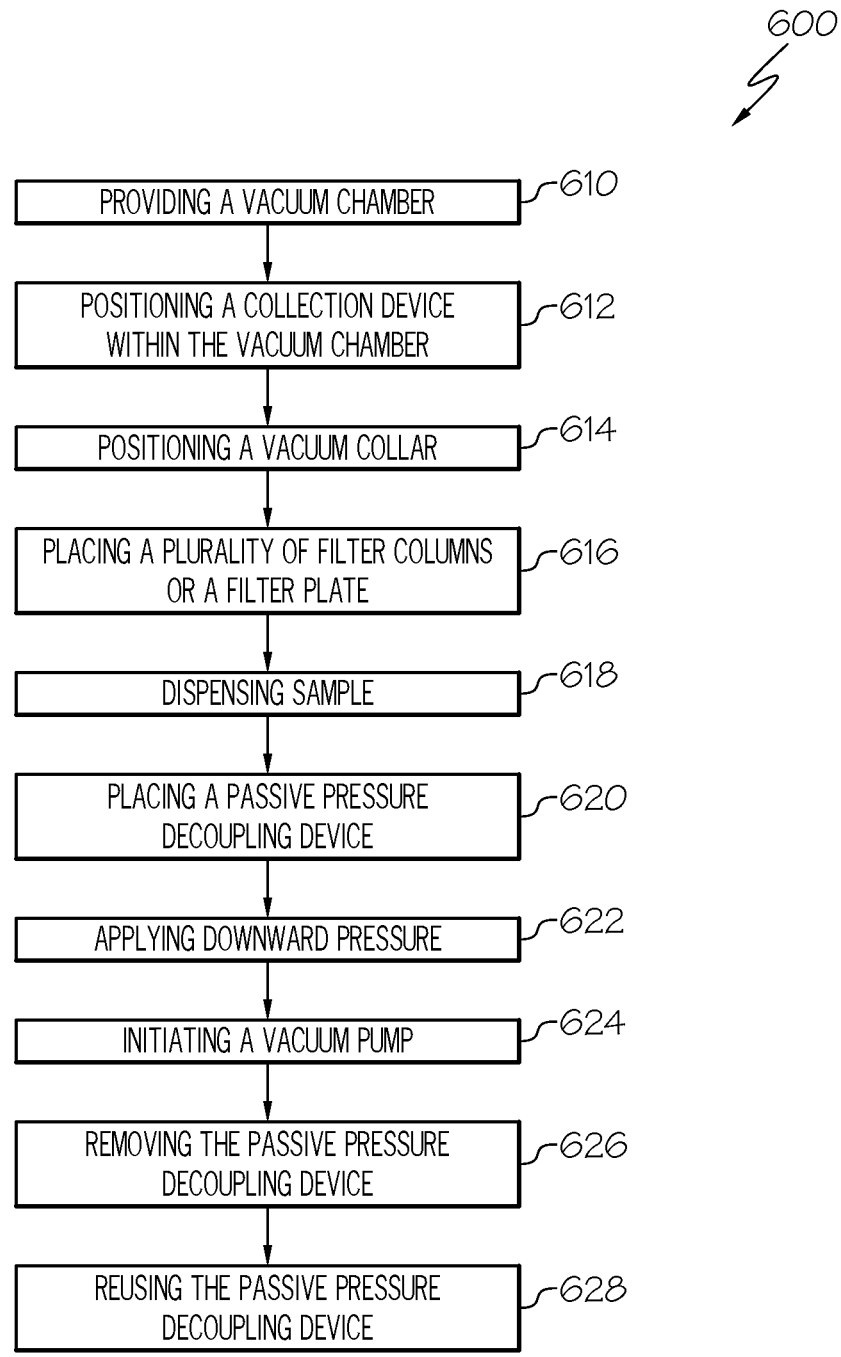
FIG. 11 depicts a method of sample filtration and/or extraction, in accordance with one embodiment.

FIG. 11 depicts an exemplary method 600 of sample filtration and/or extraction, in accordance with one embodiment. The method 600 includes various steps, including a first step 610 of providing a vacuum chamber, such as one of the vacuum chambers 330, 440, 525 described hereinabove. In various embodiments it is contemplated that an automated system such as the automated robotic system 540, may position the vacuum chamber in a predetermined location for testing during this step.

The method includes a next step 612 of positioning a collection device, such as the collection device 529, within the vacuum chamber. Positioning the collection device within the vacuum chamber may include placing the vacuum chamber over the collection device 529, once the collection device is correctly positioned within the system over a vacuum manifold of the system, such as the vacuum manifold 510. Once positioned properly within the vacuum chamber, eventually filter columns or a filter plate will be placed over the collection device. Like the previous step, and automated system may ensure that the collection device is located within the vacuum chamber.

The method 600 may include a next step 614 of positioning a vacuum collar, such as the vacuum collar 520, around a portion of the vacuum chamber above the positioned collection device. The vacuum collar may be configured to receive filter columns or a filter plate thereupon in a manner which maintains a seal so that the negative air pressure created by the vacuum cannot escape around an outside of the received filter columns or filter plate. The vacuum collar may be attached or positioned manually, or may alternatively be positioned using an automated system.

Next, the method 600 includes a step 616 of placing a plurality of filter columns or a filter plate, such as the filter columns 320, 421, 422, 530, such that a bottom side of the plurality of filter columns or the filter plate is within the vacuum chamber. As described, the plurality of filter columns or the filter plate including a plurality of openings configured to receive a sample, the plurality of openings exposed to a top side of the plurality of filter columns or the filter plate. The filter columns or filter plate may be attached or positioned manually, or may alternatively be positioned using an automated system.

The method 600 next includes a step 618 of dispensing a sample, such as the sample 311, into one or more of the plurality of openings of the plurality of filter columns or the filter plate. The method may include dispensing the sample into only a portion of the possible openings out of the entirety plurality of openings, leaving some unused columns, or filter locations within a filter plate. In the event that the automated robotic system includes a single arm or manipulation head, it is possible that such a head includes various different attachments in order to provide for different functionalities. It is possible that a dispense functionality may require a different style of attachment, end effector, or the like. Such a dispensing end effector may be in fluidic communication with a sample source. Such an attachment or different style end effector is not shown in FIGS. 6-10.

The method 600 next includes a step 620 of placing a passive pressure decoupling device on a top side of the plurality of filter columns or the filter plate, such as one the passive pressure decoupling devices 300, 400, 550. In some embodiments of the method, the passive pressure decoupling device includes a reserve air volume structure above each of the plurality of openings, such as in the passive pressure decoupling devices 400, 550. The step 620 may further include covering, by the passive pressure decoupling device, each of the plurality of openings by the passive pressure decoupling device, including those which have a sample present, and those which are unused and do not have a sample therein. The method 600 includes a next step 622 of applying downward pressure on the passive pressure decoupling device in order to secure the passive pressure decoupling device onto the plurality of filter columns or the filter plate. The steps 620, 622 may be performed by a different attachment, end effector, or the like than the dispensing one, and can be seen in FIGS. 6-10.

The method 600 next includes a step 624 of initiating a vacuum pump connected to the vacuum chamber via, for example, the vacuum manifold, to create a vacuum pressure within the vacuum chamber to allow the dispensed sample to move downward through the plurality of filter columns or the filter plate and into the collection device. The vacuum pump may be attached at an end of the airflow conduit 511. The vacuum pump may provide a negative pressure in the vacuum chamber by pulling airflow from the vacuum chamber, through the vacuum manifold, and through the airflow conduit 511. This may create the negative pressure needed to pull sample from the plurality of columns and/or filter plate and into the collection device.

Once the collection, filtration and/or extraction is complete, the method 600 may include ending the vacuum pump and then a step 626 of removing the passive pressure decoupling device from the top side of the plurality of filter columns or the filter plate. Such as step may be automatically conducted by the automated system. A final step 628 of the method 600 may include reusing the passive pressure decoupling device on an additional filtration or extraction of another sample using a different plurality of filter columns or filter plate. The method 600 may include continual reuse of the passive pressure decoupling device for many filtrations and/or extractions of many different samples in many different processes.

Figure 12:
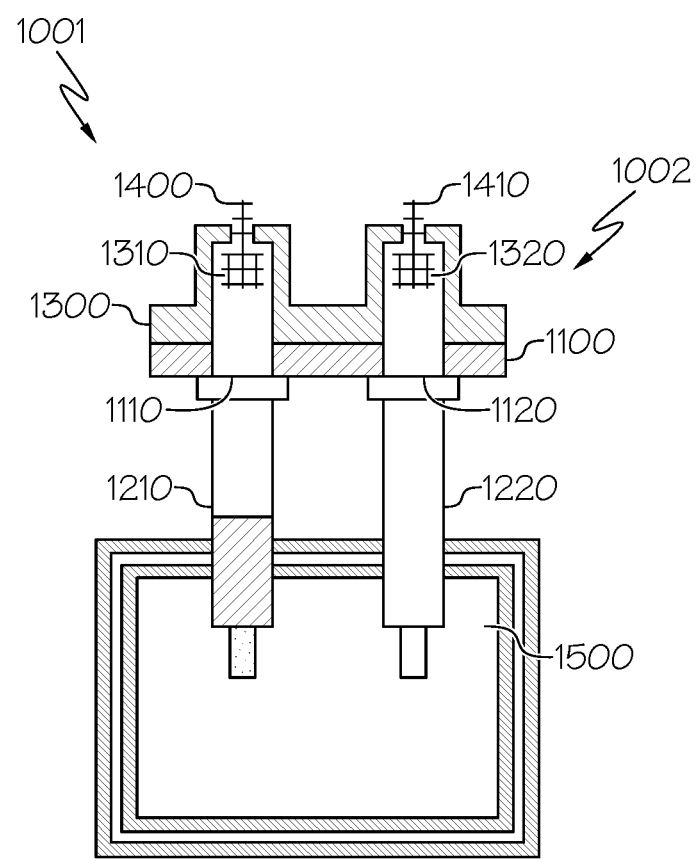
FIG. 12 depicts a schematic view of another sample filtration and/or extraction system, in accordance with one embodiment.

FIG. 12 depicts a schematic view of another sample filtration and/or extraction system 1001, in accordance with one embodiment. The sample filtration and/or extraction system 1001 may be similar to the above-described sample filtration and/or extraction systems 301, 401. For example, the sample filtration and/or extraction system 1001 includes a vacuum chamber 1500 like the vacuum chambers 330, 440. The sample filtration and/or extraction system 1001 includes a first filter column 1210 (like the first filter columns 310, 421) filled with a sample and having a filtering medium at a bottom end. The sample filtration and/or extraction system 1001 further includes a second filter column 1220 (like the second filter columns 320, 422) that is empty and includes no sample or filtering medium.

Unlike the sample filtration and/or extraction system 301, but like the sample filtration and/or extraction system 401, the sample filtration and/or extraction system 1001 includes a passive pressure decoupling device 1002 which includes a reserve air volume structure 1310, 1320 above each of the plurality of openings. As shown, the passive pressure decoupling device 1002 includes multiple layers. A first sealing layer 1100 may be made of a sealing material that is designed to create a seal at the top of the openings of the columns 1210, 1220 (or the openings of a filter plate). The first sealing layer 1100 may include openings 1110, 1120 which align with the openings of the columns 1210, 1220 (or the openings of a filter plate). The first sealing layer 1110 may create an air-tight seal in this manner when the vacuum chamber 1500 is pressurized by a vacuum pump. In some embodiments, the sealing layer 1100 may be unnecessary, and the passive pressure decoupling device 1002 may comprise a single solid material which may be configured to be compressed tightly against the top of the openings of the columns 1210, 1220 during vacuum pressurization.

The passive pressure decoupling device 1002 further is shown having a solid structure 1300 located above the first sealing layer 1100. The solid structure 1300 is designed to create the reserve air volume structures 1310, 1320 above each of the filter columns 1210, 1220. The reserve air volume structures 1310, 1320 may be air volume cells which include a pre-defined volume. The volume in each chamber above each of the openings of the columns 1210, 1220 may be the same, in one embodiment. In other embodiments, the passive pressure decoupling device 1002 may provide different cell volumes above different columns, depending on the application. Whatever the embodiment, the volumes may ensure that a pre-defined amount of air will move through each column when the reduction of pressure is applied to the vacuum chamber 1500 by the vacuum pump.

Additionally, the sample filtration and/or extraction system 1001 includes a mechanism or structure configured to keep the pressure of the reserve air volume structures 1310, 1320 above each of the filter columns 1210, 1220 constant. In the embodiment shown in FIG. 4, for example, the air pressure in the reserve air volume structures 431, 432 may decrease while liquid within the filter columns 1210, 1220 goes through the column and exits therefrom. This may cause a decrease in differential pressure during the extraction of the liquid. To avoid this scenario, embodiments contemplated herein contemplate reducing the volume in the reserve air volume structures 1310, 1320 as the liquid is removed from the filter columns 1210, 1220 to keep the total volume combination between the space above the liquid in the filter columns 1210, 1220 and within the reserve air volume structures 1310, 1320 constant during extraction.

Specifically, in the embodiment shown in FIG. 12, the passive pressure decoupling device 1002 includes a plunger 1400, 1410 at a top end of each of the reserve air volume structures 1310, 1320. The plungers 1400, 1410 may be configured to move independently from each other, and may further be configured to move downward within the reserve air volume structures 1310, 1320, respectively, during the extraction of the liquid within the filter columns 1210, 1220. The movement of the plunger 1400, 1410 may be configured to compensate for the differential pressure that would otherwise be caused by the extraction of the liquid from the filter columns 1210, 1220. The movement of the plungers 1400, 1410 towards the bottom of the reserve air volume structures 1310, 1320 may further guarantee that the pressure inside the vacuum chamber 1500 is maintained constant up to the moment when the filter columns 1210, 1220 are fully empty.

In another embodiment, the plungers 1400, 1410 may be connected to a device or system which moves the plungers 1400, 1410 back at the original position when the vacuum in the manifold (e.g. 510) is removed. This may be achieved, but not only, using spring-based solution or using external actuators. Alternatively, this may be accomplished by hand (i.e. manually moving the plungers 1400, 1410 back up to a full volume starting position. In some embodiments, the plungers 1400, 1410 may be passive in function and be configured to move downward with extremely low friction in response to changes in pressure and volume caused by extraction of fluid from the reserve air volume structures 1310, 1320.

Figure 13:
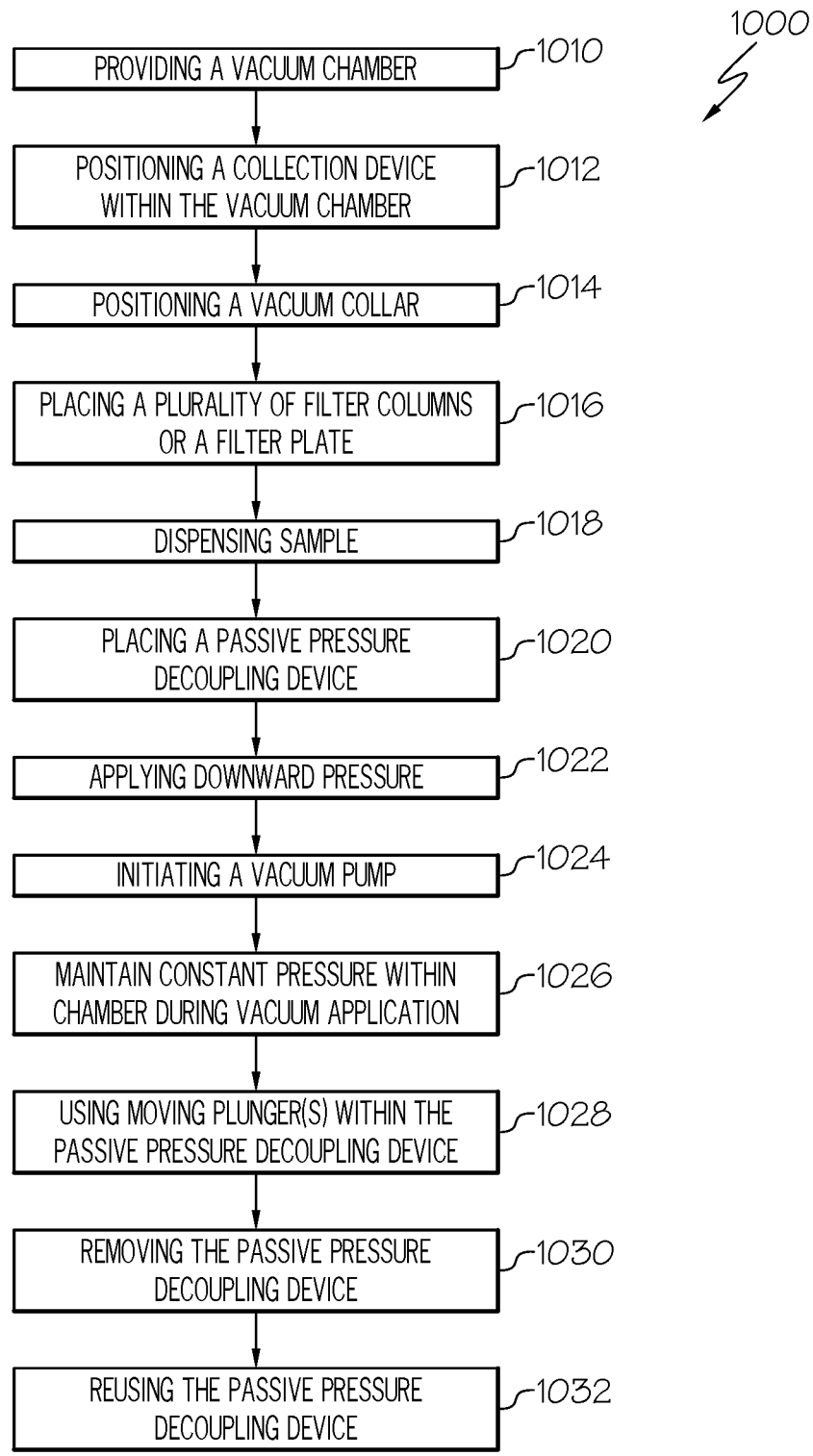
FIG. 13 depicts another method of sample filtration and/or extraction, in accordance with one embodiment.

FIG. 13 depicts another method of sample filtration and/or extraction, in accordance with one embodiment. The method 1000 includes various steps, including a first step 1010 of providing a vacuum chamber, such as one of the vacuum chambers 330, 440, 525, 1500 described hereinabove. In various embodiments it is contemplated that an automated system such as the automated robotic system 540, may position the vacuum chamber in a predetermined location for testing during this step.

The method includes a next step 1012 of positioning a collection device, such as the collection device 529, within the vacuum chamber. Positioning the collection device within the vacuum chamber may include placing the vacuum chamber over the collection device 529, once the collection device is correctly positioned within the system over a vacuum manifold of the system, such as the vacuum manifold 510. Once positioned properly within the vacuum chamber, eventually filter columns or a filter plate will be placed over the collection device. Like the previous step, and automated system may ensure that the collection device is located within the vacuum chamber.

The method 1000 may include a next step 1014 of positioning a vacuum collar, such as the vacuum collar 520, around a portion of the vacuum chamber above the positioned collection device. The vacuum collar may be configured to receive filter columns or a filter plate thereupon in a manner which maintains a seal so that the negative air pressure created by the vacuum cannot escape around an outside of the received filter columns or filter plate. The vacuum collar may be attached or positioned manually, or may alternatively be positioned using an automated system.

Next, the method 1000 includes a step 1016 of placing a plurality of filter columns or a filter plate, such as the filter columns 320, 421, 422, 530, 1310, 1320 such that a bottom side of the plurality of filter columns or the filter plate is within the vacuum chamber. As described, the plurality of filter columns or the filter plate including a plurality of openings configured to receive a sample, the plurality of openings exposed to a top side of the plurality of filter columns or the filter plate. The filter columns or filter plate may be attached or positioned manually, or may alternatively be positioned using an automated system.

The method 1000 next includes a step 1018 of dispensing a sample, such as the sample 311, into one or more of the plurality of openings of the plurality of filter columns or the filter plate. The method may 1000 include dispensing the sample into only a portion of the possible openings out of the entirety plurality of openings, leaving some unused columns, or filter locations within a filter plate. In the event that the automated robotic system includes a single arm or manipulation head, it is possible that such a head includes various different attachments in order to provide for different functionalities. It is possible that a dispense functionality may require a different style of attachment, end effector, or the like. Such a dispensing end effector may be in fluidic communication with a sample source. Such an attachment or different style end effector is not shown in FIGS. 6-10 and 12.

The method 1000 next includes a step 1020 of placing a passive pressure decoupling device on a top side of the plurality of filter columns or the filter plate, such as one the passive pressure decoupling devices 300, 400, 550, 1002. In some embodiments of the method, the passive pressure decoupling device includes a reserve air volume structure above each of the plurality of openings, such as in the passive pressure decoupling devices 400, 550, 1002. The step 1020 may further include covering, by the passive pressure decoupling device, each of the plurality of openings by the passive pressure decoupling device, including those which have a sample present, and those which are unused and do not have a sample therein. The method 1000 includes a next step 1022 of applying downward pressure on the passive pressure decoupling device in order to secure the passive pressure decoupling device onto the plurality of filter columns or the filter plate. The steps 1020, 1022 may be performed by a different attachment, end effector, or the like than the dispensing one, and can be seen in FIGS. 6-10.

The method 1000 next includes a step 1024 of initiating a vacuum pump connected to the vacuum chamber via, for example, the vacuum manifold, to create a vacuum pressure within the vacuum chamber to allow the dispensed sample to move downward through the plurality of filter columns or the filter plate and into the collection device. The vacuum pump may be attached at an end of the airflow conduit 511. The vacuum pump may provide a negative pressure in the vacuum chamber by pulling airflow from the vacuum chamber, through the vacuum manifold, and through the airflow conduit 511. This may create the negative pressure needed to pull sample from the plurality of columns and/or filter plate and into the collection device.

The method 1000 may include a next step 1026 of maintaining a constant pressure within the chamber during vacuum application and/or maintaining a constant pressure within the space defined above the liquid within the filter column, such as the filter columns 1210, 1220 and the reserve air volume structures 1310, 1320 shown in FIG. 12. The method 1000 may further include a step 1028 of moving a plunger device or system, such as the plungers 1400, 1410 within the passive pressure decoupling device. Specifically, the step 1028 may include moving these plungers downward during expansion of the space caused by the extraction of liquid from the filter columns in order to maintain a constant volume of space above the liquid during extraction.

Once the collection, filtration and/or extraction is complete, the method 1000 may include ending the vacuum pump and then a step 1030 of removing the passive pressure decoupling device from the top side of the plurality of filter columns or the filter plate. Such as step may be automatically conducted by the automated system. A final step 1032 of the method 1000 may include reusing the passive pressure decoupling device on an additional filtration or extraction of another sample using a different plurality of filter columns or filter plate. The method 1000 may include continual reuse of the passive pressure decoupling device for many filtrations and/or extractions of many different samples in many different processes. While not shown, the method 1000 may include automatically or manually moving the plungers back upward to their original position within the reserve air volume structures.

Figure 14:
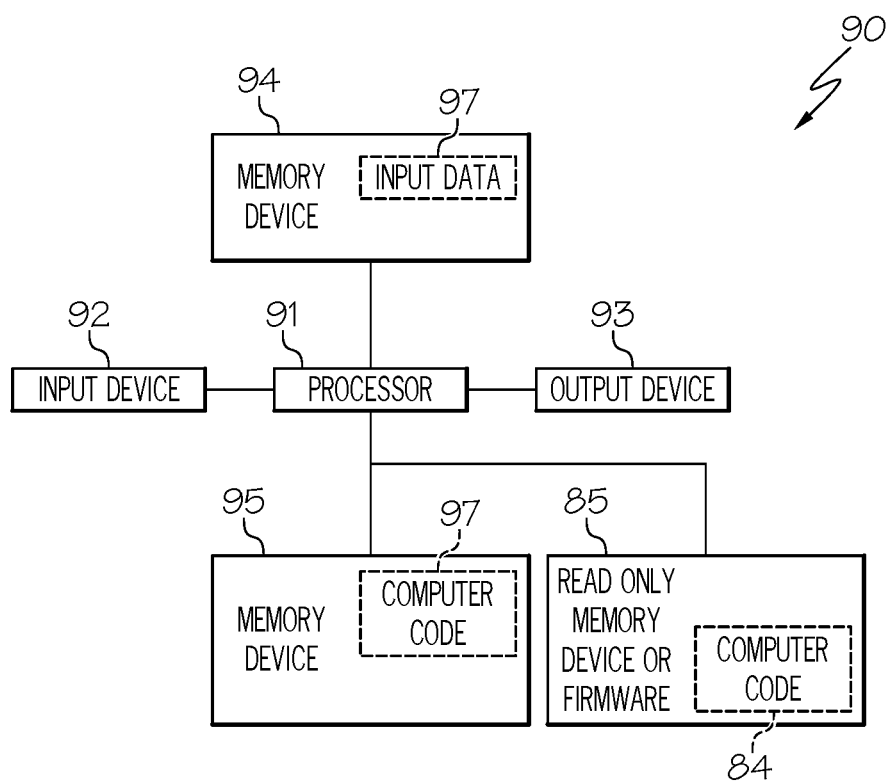
FIG. 14 depicts a computer system used by the automated robotic system shown in FIGS. 5-10, in accordance with one embodiment.

FIG. 14 depicts a computer system used by the automated robotic system shown in FIGS. 5-10 and 12, in accordance with one embodiment. Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product, such as a computer program product for controlling the automation of the automated robotic system configured for sample filtration and/or extraction as described herein. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods (such as those in FIG. 11), devices or systems (such as those in FIGS. 1-10 and 12), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 14 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 11) for improving software implemented control of an automated robotic system of a sample filtration and/or extraction system. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as read only memory device 96) may include algorithms (e.g., the algorithm of FIG. 11) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

While FIG. 14 shows the computer system 90 as a particular configuration of hardware and software, any configuration of hardware and software, as would be known to a person of ordinary skill in the art, may be utilized for the purposes stated supra in conjunction with the particular computer system 90 of FIG. 14. For example, the memory devices 94 and 95 may be portions of a single memory device rather than separate memory devices.

While the invention has been shown and described with reference to specific embodiments, it should be understood by those skilled in the art that various changes in form and detail may be made therein without departing from the spirit and scope of the invention as recited in the accompanying claims.

What is claimed is:

1. A sample filtration and/or extraction system comprising:
a vacuum manifold configured to connect with a vacuum pump;
a vacuum chamber such that each of a plurality of filter columns is configured to be disposed at least partially within the vacuum chamber, the plurality of filter columns each including an opening configured to receive a sample, wherein each of the openings define a plurality of openings; and
a passive pressure decoupling device configured to be placed on a top of the plurality of filter columns, such that each of the plurality of openings of the plurality of filter columns is covered by the passive pressure decoupling device, wherein the passive pressure decoupling device includes a plurality of reserve air volume cells each including a pre-defined volume, one of the plurality of the reserve air volume cells above each of the plurality of openings.

2. The sample filtration and/or extraction system of claim 1, further comprising:
a collection device located within the vacuum chamber, the collection device including a plurality of collection wells for receiving the sample from the plurality of filter columns.

3. The sample filtration and/or extraction system of claim 1, further comprising:
a vacuum collar configured to host the plurality of filter columns, the vacuum collar comprising at least a portion of the vacuum chamber.

4. The sample filtration and/or extraction system of claim 1, further comprising an automated robotic system configured to place the passive pressure decoupling device on the top of the plurality of filter columns.

5. The sample filtration and/or extraction system of claim 4, wherein an automated robotic gripper system is to remove the passive pressure decoupling device from the top of the plurality of filter columns.

6. The sample filtration and/or extraction system of claim 5, wherein the automated robotic system is configured to dispense the sample into the plurality of openings of the plurality of filter columns.

7. The sample filtration and/or extraction system of claim 6, wherein the automated robotic system is configured to apply a downward pressure on the passive pressure decoupling device in order to secure the passive pressure decoupling device onto the plurality of filter columns.

8. The sample filtration and/or extraction system of claim 1, wherein the reserve air volume cells above each of the plurality of openings is a separate air volume for each of the plurality of openings configured to create a local chamber volume of air above each of the plurality of openings.

9. The sample filtration and/or extraction system of claim 1, wherein the passive pressure decoupling device is configured to be reused for a plurality of sample filtrations and/or extractions.

10. A sample filtration and/or extraction apparatus comprising:
a passive pressure decoupling device configured to be placed on a top of a plurality of filter columns each including an opening configured to receive a sample, wherein each of the openings define a plurality of openings, and wherein each of the plurality of openings is covered by the passive pressure decoupling device, wherein the passive pressure decoupling device includes a plurality of reserve air volume cells each including a pre-defined volume, one of the plurality of the reserve air volume cells above each of the plurality of openings.

11. The sample filtration and/or extraction apparatus of claim 10, wherein the reserve air volume structure above each of the plurality of openings is a separate air volume for each of the plurality of openings configured to create a local chamber volume of air above each of the plurality of openings.

12. The sample filtration and/or extraction apparatus of claim 11, wherein the passive pressure decoupling device is configured to be reused for a plurality of sample filtrations and/or extractions.

13. A method of sample filtration and/or extraction comprising:
providing a vacuum chamber;
placing a plurality of filter columns such that a bottom side of the plurality of filter columns is within the vacuum chamber, the plurality of filter columns each including an opening configured to receive a sample, wherein each of the openings define a plurality of openings;

placing a passive pressure decoupling device on a top side of the plurality of filter columns, wherein the passive pressure decoupling device includes a plurality of reserve air volume cells each including a pre-defined volume, one of the plurality of reserve air volume cells above each of the plurality of openings; and covering, by the passive pressure decoupling device, each of the plurality of openings.

14. The method of sample filtration and/or extraction of claim 13, further comprising:

positioning a collection device within the vacuum chamber, wherein the plurality of filter columns are placed above the positioned collection device.

15. The method of sample filtration and/or extraction of claim 14, further comprising:

positioning a vacuum collar around a portion of the vacuum chamber above the positioned collection device.

16. The method of sample filtration and/or extraction of claim 15, further comprising:

dispensing, by an automated robotic system, at least one sample within at least one of the plurality of openings of the plurality of filter columns.

17. The method of sample filtration and/or extraction of claim 16, further comprising:

performing, by the automated robotic system, the placing the passive pressure decoupling device on a top side of the plurality of filter columns.

18. The method of sample filtration and/or extraction of claim 17, further comprising:

applying, by the automated robotic system, downward pressure on the passive pressure decoupling device in order to secure the passive pressure decoupling device onto the plurality of filter columns.

19. The method of sample filtration and/or extraction of claim 18, further comprising:

initiating a vacuum pump connected to the vacuum chamber to create a vacuum pressure within the vacuum chamber to allow the dispensed sample to move downward through the plurality of filter columns and into the collection device.

20. The method of sample filtration and/or extraction of claim 19, further comprising:

removing, by the automated robotic system, the passive pressure decoupling device from the top side of the plurality of filter columns; and reusing the passive pressure decoupling device on an additional filtration or extraction of another sample using a different plurality of filter columns or filter plate.

* * * * *